E. H. LANCASTER & T. SHULL.
CORN-PLANTER.
No. 193,258. Patented July 17, 1877.
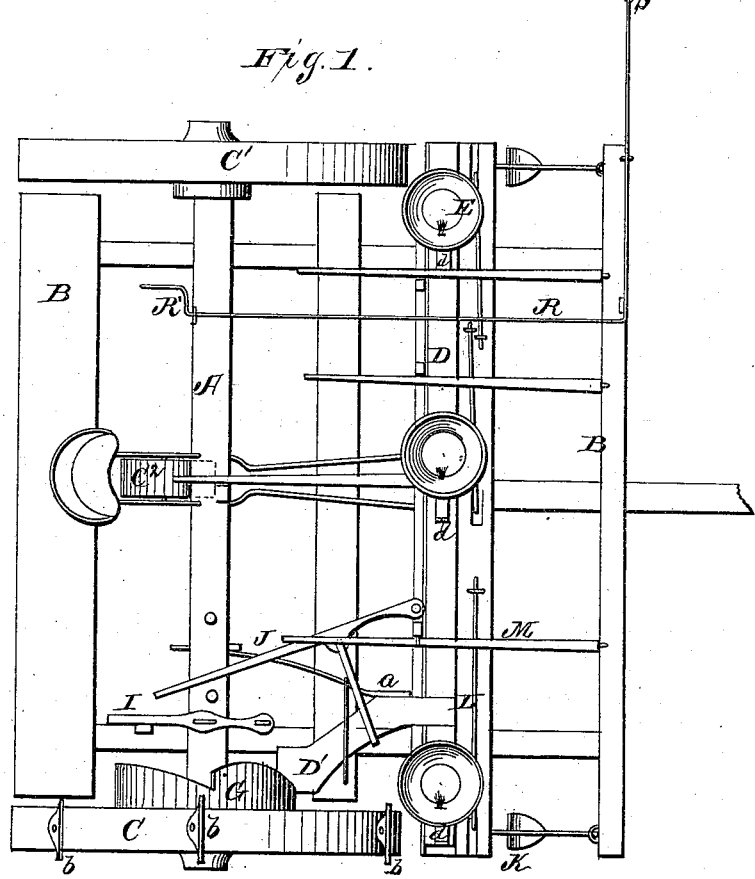
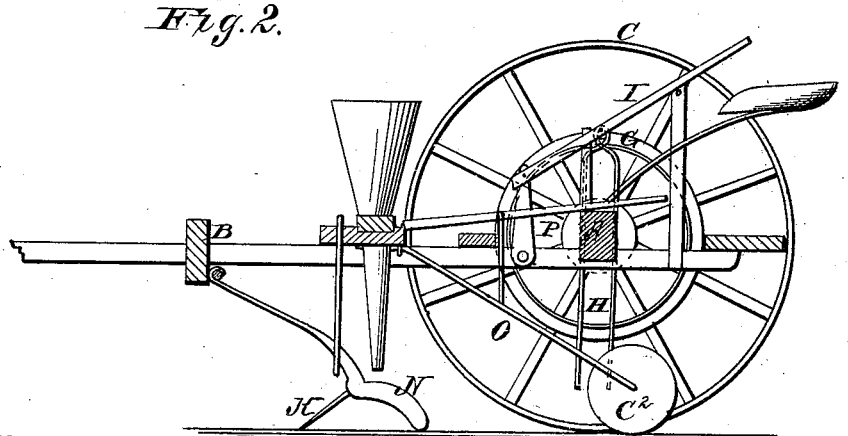
WITNESSES
Franck L. Ourand
H. M. Miller
INVENTOR
E. H. Lancaster & Thos. Shull
Alexander Mason
ATTORNEYS.

UNITED STATES PATENT OFFICE.

ELIAS H. LANCASTER AND THOMAS SHULL, OF MONTPELIER, INDIANA.

IMPROVEMENT IN CORN-PLANTERS.

Specification forming part of Letters Patent No. 193,258, dated July 17, 1877; application filed March 26, 1877.

*To all whom it may concern:*

Be it known that we, ELIAS H. LANCASTER and THOMAS SHULL, of Montpelier, in the county of Blackford, and in the State of Indiana, have invented certain new and useful Improvements in Corn-Planters and Corn-Drills; and do hereby declare that the following is a full, clear, and exact description thereof, reference being had to the accompanying drawing, and to the letters of reference marked thereon, making a part of this specification.

The nature of our invention consists in the construction and arrangement of a combined corn-planter and drill, which will furrow, mark, and plant rows both ways, or drill, as desired, in passing once over the ground, as will be hereinafter more fully set forth.

In order to enable others skilled in the art to which our invention appertains to make and use the same, we will now proceed to describe its construction and operation, referring to the annexed drawing, in which—

Figure 1 is a plan view, and Fig. 2 a longitudinal vertical section of our machine.

A represents the axle, to which the framework B is firmly attached, and on the ends of which the wheels C $C^1$ rotate.

On one of the cross-bars of the frame B are arranged the corn-hoppers E, with a single dropping-slide, D, going through them all. The axle A may be of any length desired to plant two, three, or four rows at a time, more or less.

The wheel C governs the planting and drilling in part by means of a cam-rim, G, attached to it. This rim operates on an arm, D′, projecting from the dropping-slide D, and a spring, *a*, is arranged to operate on said arm in the opposite direction.

The cam-rim G is constructed, as shown in Fig. 1, so that by the assistance of the spring *a* it governs the dropping-slide D, and passes it back slowly until the corn is about to drop, when it moves suddenly, dropping the corn all at once, that the corn may not be scattered, but dropped in proper hills, in order to plant rows crosswise correctly. The rim G may be so shaped and notched as to drop any distance apart desired. When properly arranged it will plant equal distances each way.

To the rim of the wheel C are bolted crossbars or markers *b b*, which may be taken off and put on at will, and are so arranged and placed on the wheel as to come upon the ground just on the hill of corn, and make the impression so that the driver may perceive readily the rows crosswise, in order to start right and keep the rows even and correctly crosswise.

H is a stirrup, arranged in the axle A near the wheel C, and operated by a lever, I, for lifting said wheel C off of the ground, to be turned back or forward, as the case may be, to set the row back or ahead, as that governs the dropping, and thereby keeping the rows in order both ways.

If the wheel C is to be turned backward when off of the ground, the dropping-slide D must first be thrown out of gear by means of a lever, J, connected to the arm D′, as shown. The wheel C may be turned forward without throwing the slide D out of gear.

Attached to the dropping-slide D is a small slide, *d*, for each dropping-slide, to be used in case of stopping any row or hill from being dropped or planted at any time, as is often the case in finishing a field.

K K are the furrow-shovels, attached to L-shaped rods L L, which pass upward and then run on top of a cross-bar in the frame B, as shown. They are so arranged as to be a proper distance apart, directly in front of the wheels C $C^1$ and the roller $C^2$, in the center between the wheels. The shovels are kept in position by means of levers M, and are also taken up and let down at will by means of said levers, which are connected to the shovel rods or bars L. These rods or bars may be flat where they couple to the cross-bar with a bolt to hold them from turning sidewise when in the ground.

The corn will drop immediately behind the shovels, in order that the dirt may fall on the corn, the wheels and roller following immediately after assisting in covering the corn, and also mashing the clods.

When needed, covers N N may be attached to each shovel, thereby suiting the planter for all kinds of ground.

The roller $C^2$ is of sufficient weight to do its work, and is mounted in a hinged frame, O, which is raised by means of a lever, P, either in front or in rear of the axle.

R is a rod, with point S, attached to the front cross-bar of the frame. There should be one of these on each side, for a guide for the driver, that he may keep a proper distance from the rows already planted. The inner end of the rod R is bent backward for a suitable distance, and then forms a foot-crank, R', by means of which the point S is turned up at will over stumps, &c., as required. When in position said point S points directly in the row previously planted.

In order to change this planter to a drill the rim G is detached, and a similar rim put on, having more frequent notches, so that it may drop any distance desired.

The various levers described in the machine are held in their different positions by means of pins in suitable uprights attached to the frame for that purpose.

Having thus fully described our invention, what we claim as new, and desire to secure by Letters Patent, is—

1. The combination, with the axle A, of the stirrup H, straddling the axle, and the lever I for operating the stirrup vertically up and down, for the purpose herein set forth.

2. The combination of the shovel K, L-shaped bar L, and lever M, for the purposes herein set forth.

3. The combination of the L-shaped rod R, pointer S, and crank R', substantially as and for the purposes herein set forth.

In testimony that we claim the foregoing we have hereunto set our hands this 5th day of March, 1877.

ELIAS H. LANCASTER.
THOMAS SHULL.

Witnesses:
HENRY H. BENNETT,
WM. MORITZ.